United States Patent [19]

Kasper

[11] 4,184,509

[45] Jan. 22, 1980

[54] VACUUM RELIEF AND ACCESS DOOR ASSEMBLY

[75] Inventor: Gordon Kasper, Harrisonville, Mo.

[73] Assignee: Ruskin Manufacturing Company, Grandview, Mo.

[21] Appl. No.: 956,586

[22] Filed: Nov. 1, 1978

[51] Int. Cl.² ............................................ F16K 15/02
[52] U.S. Cl. ..................... 137/526; 137/559; 251/337
[58] Field of Search ............... 137/526, 559, 584; 251/337, 303

[56] References Cited

U.S. PATENT DOCUMENTS

| 2,452,612 | 11/1948 | Swenberg | 137/526 X |
| 3,782,411 | 1/1974 | Turner | 137/526 X |
| 3,899,156 | 8/1975 | McCabe | 251/303 |
| 4,140,151 | 2/1979 | Van Becelaere | 137/526 |

Primary Examiner—William R. Cline
Attorney, Agent, or Firm—Fishburn, Gold & Litman

[57] ABSTRACT

A vacuum relief and access door assembly, for use on a duct downstream of a fire or control dampers, comprises a frame including a duct facing surface with a seal member thereon, a closure member having side edges in sealing engagement with the seal member, and cooperative retaining members mounted on the frame and closure member and resiliently urging the closure member into sealing engagement with the seal member, yielding to allow the closure member to displace toward the duct to allow air flow thereby for vacuum relief and returning into sealing engagement with the seal member said retaining members being releasable for removal of said closure member.

11 Claims, 6 Drawing Figures

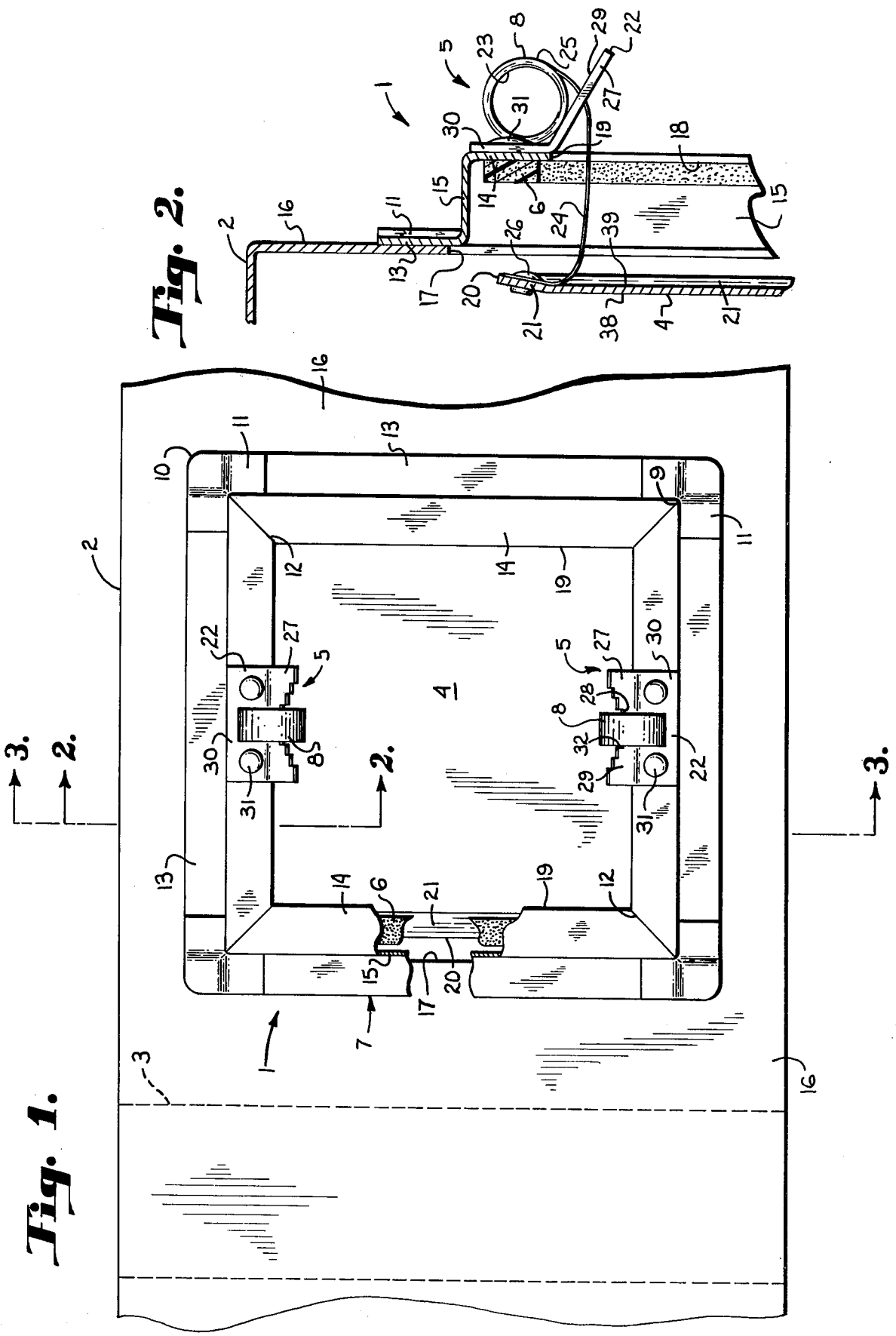

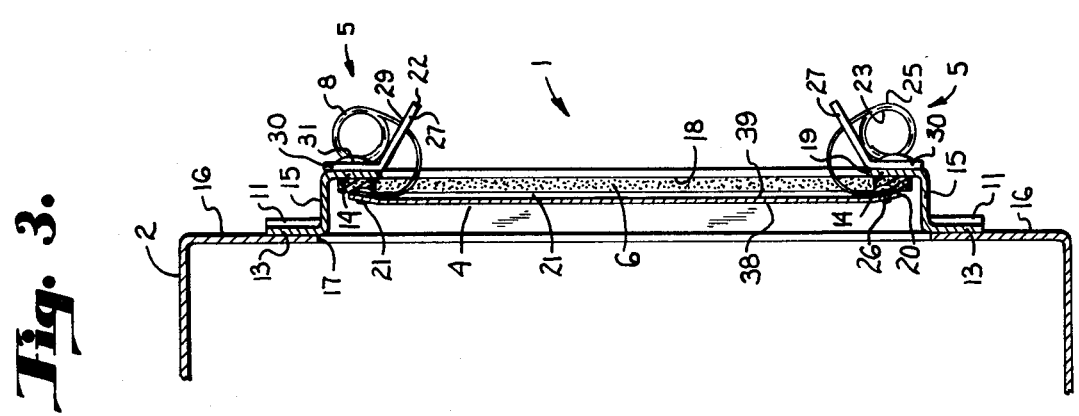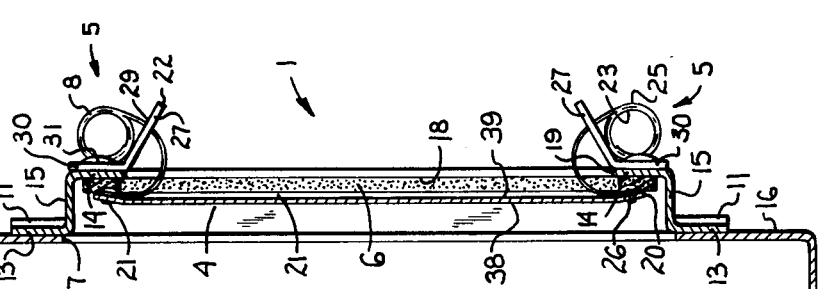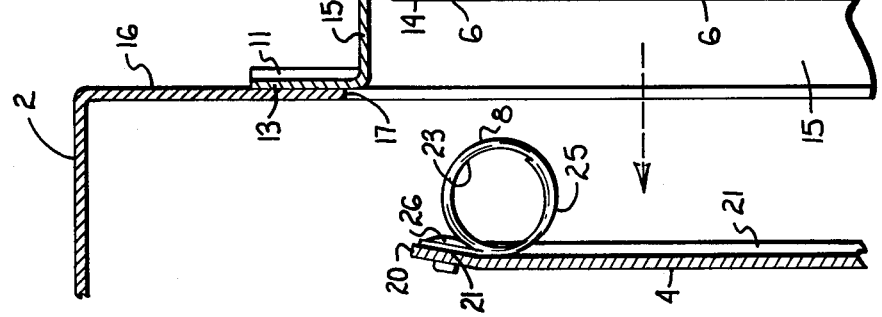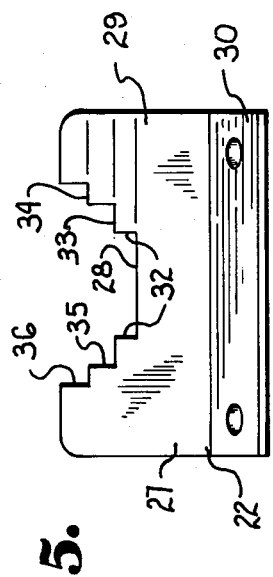

VACUUM RELIEF AND ACCESS DOOR ASSEMBLY

The present invention relates to vacuum relief doors for air or gas flow ducts and more particularly to such a door having removable retaining members with resilient portions which permit displacement for vacuum relief and which return the closure member into sealing engagement after displacement thereof for vacuum relief.

Fire regulations require the use of fire dampers in some HVAC ducts for preventing the spread of fire and toxic gases in the event of fire. The fire dampers are held open for normal airflow by fusible links which melt above a certain temperature and allow the damper to close the duct to airflow. In relatively large, high velocity ducts, deployment of a damper results in the creation of a vacuum immediately downstream of the damper due to the inertia of the moving column of air. Depending on the size of the duct and the velocity of airflow, the vacuum generated can result in collapse of the duct walls immediately downstream of the damper. Other large ducts may also have sudden pressure change that can cause collapse and therefor need relief and access doors. To prevent such duct collapse, vacuum relief doors are employed which open a relatively large area in the duct wall immediately downstream of the damper and allow a rapid inflow of air for relief of the vacuum condition.

In some vacuum relief doors of the prior art, upon creation of a vacuum within the duct, the latches holding the door on its mounting frame release and allow the door to be sucked into the duct restrained by a tether chain. In such an arrangement, the duct walls might be damaged by the door flying thereinto upon release. In any case, remounting of the door required retrieval thereof and manipulation within the duct. In other prior art structures, the doors were held in closing position by helical coil springs and guide rods which limited door opening movement and the opening force substantially increased as the door moved inwardly limiting the rate of vacuum relief. Such a vacuum relief and access door assembly is shown and described in the Van Becelaere application Ser. No. 809,604 filed June 24, 1977, now U.S. Pat. No. 4,140,151.

The vacuum relief door of the present invention resiliently displaces for vacuum relief and returns to its original position. It is then necessary to release the removable retainers and remove the door from its mounting for entry into the duct to reset the damper. This may be accomplished easily and with a minimum of door manipulation. Access to the damper for inspection is also provided at any time in the same manner.

The principal objects of the present invention are: to provide a vacuum relief and access door for a high pressure duct which door returns to closing position after the vacuum is relieved; to provide such a door for use in a duct downstream of a fire damper for preventing vacuum induced collapse of the duct upon deployment of the fire damper; to provide such a vacuum relief door which is resiliently displaceable in response to a vacuum in the duct for vacuum relief and which is restrained during operation for vacuum relief and automatically returned into sealing engagement with its frame after operation; to provide such a vacuum relief door having quickly releasable retainers for bodily removal of the door and access to the duct; to provide such a structure in which the retainers are flat spiral coil springs with a plurality of convolutions engaged over and behind abutments which partially unwind for permitting sufficient door movement to relieve a vacuum in a duct; to provide such a vacuum relief door which effects positive sealing of the duct access opening during normal operation of the duct; to provide such a vacuum relief door which is relatively easy to install and maintain; to provide such a vacuum relief door which is economical to manufacture, durable in construction, and positive in operation, and which is prticularly well adapted for its intended purpose.

Other objects and advantages of this invention will become apparent from the following description taken in connection with the accompanying drawings wherein are set forth, by way of illustration and example, certain embodiments of this invention.

The drawings constitute a part of the specification, include an exemplary embodiment of the present invention, and illustrate various objects and features of the vacuum relief door assembly.

FIG. 1 is a front elevational view of the vacuum relief door assembly attached to the wall of a duct.

FIG. 2 is a fragmentary view taken on line 2—2 of FIG. 1 and showing the door in a displaced position.

FIG. 3 is a fragmentary vertical sectional view of the vacuum relief door assembly taken along line 3—3 of FIG. 1 and showing the resilient door retainers.

FIG. 4 is a fragmentary view similar to FIG. 2 showing the door retainer released for removal of the door for access to the duct.

FIG. 5 is an elevational view of the abutment members.

FIG. 6 is a transverse sectional view at a reduced scale of a duct having a round cross-section and showing a transition duct, having the vacuum relief and access door assembly attached to one end thereof.

As required, detailed embodiments of the present invention are disclosed herein. However, it is to be understood that the disclosed embodiments are merely exemplary of the invention which may be embodied in various forms. Therefore, specific structural and functional details disclosed herein are not to be interpreted as limiting but merely as a basis for the claims and as a representative basis for teaching one skilled in the art to variously employ the present invention in virtually any appropriately detailed structure.

Referring to the drawings in more detail:

The reference numeral 1 generally designates a vacuum relief door assembly for use in a duct 2 and particularly for use in a duct downstream of a fire damper 3 mounted in the duct 2. The vacuum relief door assembly 1 comprises a door or closure member 4 resiliently held by a plurality of retainers 5 in sealing engagement with a sealing member or gasket 6 mounted on either the peripheral edge of the closure member or the door mounting frame 7, said gasket 6 being illustrated as mounted on the frame 7. The vacuum relief door assembly 1 is adapted to provide a rapid influx of air into the duct 2 in response to a vacuum condition within the duct 2 by limited displacement of the door 4 from the gasket 6 against the resilient returning force of suitable resilient members which in the illustrated structure are springs 8 of the retainers 5.

The mounting frame 7 may be any suitable arrangement with provisions for retaining the door 4, and having a flange or surface mounting the gasket 6. For reasons of manufacturing economy, the illustrated frame 7 is constructed from a single elongated sheet of metal cut, stamped, and folded into a closed rectangular frame with the free ends brought together and welded as at 9. The external corners 10 are connected and reinforced by clips or gussets 11 welded to the corner portions. The internal corners 12 are reinforced by welding adjacent edges thereof together to provide a strong frame to maintain its shape. The frame 7 so constructed is generally Z shaped in cross-section and includes an outwardly projecting, frame mounting flange 13 and inwardly projecting, closure retaining flange 14, and a web 15 connecting the flanges 13 and 14 together.

The frame 7 is suitably and sealingly attached to a duct side wall 16. The frame 7 may be attached to the duct by bolts and gaskets, but in the illustrated structure its attachment is by sealing the frame mounting flange 13 in surrounding relation to the borders of the access opening 17 with suitable high pressure sealant so it reinforces the duct walls around the opening.

The closure retainer flange 14 has mounted thereon the gasket or sealing member 6 on a surface 18 thereof which faces toward the duct 2. The gasket 6 extends around the entire periphery of the closure retaining flange 14 and is adapted to receive the closure member 4 in sealing engagement therewith. The gasket 6 may be formed of any suitable sealing material, such as polyurethane foam, which will provide an effective gas seal against the compressed air within the duct 2 under normal operating conditions.

The door or closure member 4 is a planar member having dimensions slightly greater than the opening 19 enclosed by the closure retaining flange 14. In order to provide for a more effective seal under normal operating conditions of the duct 2, the external or peripheral edge portions 20 of the door 4 are formed into an outwardly projecting rim 21. The outwardly projecting rim 21 provides stiffness for the door and allows greater compression of the gasket 6 than would be possible if the edges 20 were in the same plane as the door 4, thereby providing a more effective seal.

In certain applications of the duct 2, such as heating or air conditioning, it might be desirable for the door 4 to be thermally insulated. Such insulation for the door 4 may be provided by laminating layers of insulating material (not shown) and a support layer, or alternatively by constructing the door 4 of a homogeneous material such as a plastic having the necessary structural strength. The illustrated door 4 for noninsulative applications is constructed from a single sheet of metal cut and stamped to shape as described above.

In the structure of the invention, the door 4 is supported for vacuum relief and also is an access door for easy access to the interior of the duct and, therefore, said door is bodily removable. In the structure illustrated, spring 8 of the retainer structures 5 are connected to the door and have portions cooperatively engaged with abutment members 22 on the frame 7 to form releasable latches and also provide the resilient connections to bias the door into sealing engagement with the gasket 6. The springs 8 are relatively wide, flat springs with each wound in the spiral coil 23 having a plurality of convolutions wound in close overlying relation and spring end portion 24 extending from the outer convolution 25. There are at least two springs for a door and the number may be increased to provide appropriate forces to act on the door to support same and return the door to sealed engagement. In the structure illustrated, there are two springs in opposed relation with the coils 23 adjacent the top and bottom edges of the frame opening 19 and with the end portion 24 of the respective coils engaging the door and extending outwardly relative to the top and bottom edges of the frame opening 19. The spring end portions 24 are secured to the door by suitable fastening devices 26 such as rivets or the like.

The abutment members 22 are mounted on the door frame with each having a wall portion 27 extending outwardly away from the duct. The wall portions have outer edges 28 and rear surfaces 29 adapted to be engaged by the springs 8 of the retainers 5. In the structure illustrated, the abutment members are generally angle shaped with a mounting flange 30 of each engaging the outer surface of the flange 14 and secured thereto by suitable fastening devices, such as rivets 31. The abutment member walls extend outwardly from the flanges 30 and are inclined inwardly relative to the frame opening so as to position the outer edges 28 inwardly of the frame opening edges. The angle between the wall portions 27 and the plane of the flanges 14 of the frame are preferably in the nature of 60 degrees to 70 degrees for optimum positioning of the retainer springs. The abutment member wall portions 27 in the illustrated structure have outstanding portions or sides 32 at ends of the edges 28. The spacing of the sides 32 is slightly wider than the width of the flat spring members so as to limit lateral movement thereof. The side members 32 are of stepped formation to provide additional outer edges 33 and 34 with corresponding side limits 35 and 36 respectively providing the abutments with outer edges and side limits for accommodating wider springs if stronger or larger forces are desired to hold the door in sealed engagement. The spring coils extend from the door 4 over the outer edges 28 with the plurality of convolutions of the spring engaged with the rear surfaces 29 of the abutment members so that the springs 8 and the abutment members 22 form latch structures to retain the door 4 in sealed engagement with the gasket 6.

Access may be quickly and easily obtained through the access opening. As for example, grasping the coil portions 23 engaged with the rear surfaces 29 of the abutment members and moving same outwardly and inwardly to lift the coil portions over the respective outer edges 28 releases the springs. The release of the engagement of the springs 8 with the outer edges 28 releases the door 4 so it can be moved freely away from the frame 7 so that the door can be bodily moved and positioned in the duct or turned and withdrawn through the access opening. The door 4 may be remounted by reversing the procedure, namely, moving the door in the duct, grasping the coil portions 23 of the springs and moving same through the frame opening so as to position the door rim 21 in engagement with the gasket 6. The coil portions of the springs are then pulled outwardly and moved over the outer edges 28 and inwardly whereby the coil portions 23 engage the rear surfaces 29 of the abutment members 22. The springs are then urging the door into engagement with the gasket 6 with sufficient force to hold same in the sealed position. Access can also be obtained by releasing one of the spring coils 23 from one abutment 22 so that the other spring will still be retained and then the door can be swung inwardly into the duct with said other spring retainer serving as a hinge.

The operation of the structure as a vacuum relief door assembly in such that the door is normally held in sealed engagement. Whenever a fire damper 3 is deployed in an operating duct 2, a vacuum is created in the duct immediately downstream of the damper. Such a vacuum creates a pressure differential on the closure member 4 of the vacuum relief door assembly 1. The pressure on the inside 38 of the door 4 is negative while the pressure on the outside surface 39 is positive with the result that the door is drawn inward toward the duct 2 separating the door edges or rim 21 from the gasket or seal 6 and permitting the entry of air to relieve the pressure differential. With such an action, the force on the door drawing same inwardly toward the duct draws a portion of the springs from the wound convolutions moving same over the outer edges 28 and inward to permit the necessary movement of the door to provide sufficient opening to relieve the vacuum. This movement is permitted by unwinding portions of the springs but with the other convolutions remaining in engagement with the rear surfaces 29 and when the vacuum is relieved the coils rewind returning the door 4 to its sealed engagement with the door frame gasket 6. The arrangement of the springs and engagement with the outer surfaces 28 and sides 32 form guides that guide the door as it is returned to the sealed position. The springs and their engagement with the abutment members is such that the forces biasing the door to the return to sealed engagement is generally linear. This permits adequate force to hold the door in sealed engagement and prevent fluttering from any vibrations in the air stream moving in the duct and still permit substantial opening movement of the door for relief of the vacuum. While the vacuum relief door assembly 1 is illustrated with two retainers 5, it is to be understood that in a relatively large assembly for correspondingly large duct 2 it may be necessary to employ more retainers, however, preferably always in pairs.

If the vacuum relief and access door assembly 1 is to be used on a duct 40 having a round cross section, it will be necessary to include a transition duct 41 between the duct 40 and the assembly 1 as illustrated in FIG. 6. While it would be possible to construct the assembly 1 essentially as described above with curved side members of the frame 7 and a curved closure member 4, such an approach would encounter higher manufacturing costs, possibly sealing problems and more critical design.

The transition duct 41 may have any suitable cross section and is illustrated as being rectangular. The inner or rear end 42 of the transition duct 41 is cut to fit the shape of the curved wall 43 of the round duct 40 and is sealingly attached to the wall 43 in surrounding relation to the access opening 44 in the wall 43. The outer or front end of the transition duct is cut flat to sealingly receive the mounting frame 7 of the vacuum relief and access door assembly 1 attached thereon. The front end 45 may include an inwardly turned flange 46 for facilitating attachment of the mounting frame 7 thereto. The operation of the vacuum relief and access door assembly on such a transition duct would be the same as described in the above relative to the form shown in FIGS. 1 to 5 inclusive.

While certain forms of the present invention have been described and illustrated, it is not to be limited thereto except insofar as such limitations are included in the following claims.

What I claim and desire to secure by Letters Patent is:

1. A vacuum relief and access door assembly for use on a duct having an access opening in a wall thereof, comprising:

(a) a door mounting frame sealingly attached to a duct wall and defining a door opening communicating with a duct; said frame having abutment portions with edges spaced outwardly from the frame away from the duct and rear surfaces facing laterally outward from the door opening;
   (b) sealing means mounted on said door frame and facing said duct;
   (c) an access door for positioning on the duct side of the door frame; and
   (d) mounting means for releasably mounting the access door on the duct side of the door frame in sealing engagement with said sealing means, said mounting means comprising at least two flat spiral coil springs on opposite sides of the door opening and with end portions secured relative to the door and coils having a plurality of convolutions releasably engaged over the edges of the abutment portions and with said rear surfaces, and operable to pay out said springs from the coils in response to negative pressure in said duct to permit said access door to temporarily displace from said seating engagement for relief of said negative pressure and return into sealing engagement.

2. A vacuum relief and access door assembly as set forth in claim 1 wherein:

(a) said abutment portions are guide brackets fixed to the door frame adjacent the door opening with a wall extending from the frame away from the duct, said walls having said edges recessed from the end thereof providing side portions in close proximity to the flat springs to limit lateral movement of the flat spiral springs.

3. A vacuum relief and access door assembly as set forth in claim 2 wherein:

(a) said guide brackets are fixed to the frame on opposite sides of the access opening and said walls thereof extend outwardly from adjacent the access opening and generally normal thereto, said walls each having an outer edge with upstanding members on each side with spacing for the spring to extend therebetween; and
   (b) said secured spring ends being secured to said closure member with the spring extending therefrom through the access opening and over said wall edge and the coil engaging said respective wall between said edge and said frame, said springs and guide members cooperating to form releasable latch members operable to release the access door in response to movement of a spring coil over the wall edge of the guide bracket and toward the access door.

4. A vacuum relief and access door assembly as set forth in claim 3 wherein:

(a) the spacing between the upstanding members on the walls of the guide bracket is such that the spring width passes therebetween and lateral movement thereof is limited; and
   (b) the flat springs are adjacent portions of the frame defining the access opening and cooperate with the engagement of the springs with the guide member wall and upstanding members thereof to position the access door in frame engaging position for closing the access opening.

5. A vacuum relief and access door assembly as set forth in claim 4 wherein:

(a) the engagement of each flat spiral spring member with a respective guide bracket is independent of the engagement of other flat spiral spring members and is operative to permit the access door to pivot relative to the door frame when all other flat spiral spring coils are released from respective guide members.

6. A vacuum relief and access door assembly for use on a duct having an access opening in a wall thereof, comprising:
   (a) a door mounting frame sealingly attached to a duct wall surrounding the borders of an access opening, said frame including a closure retaining flange having a surface facing said duct;
   (b) an access door having one side facing said duct and having a peripheral edge portion facing said facing surface of the retaining flange;
   (c) a resilient peripheral seal member on one of said retaining flange surface and said peripheral edge portion of the access door;
   (d) at least two guide members in spaced apart opposed positions on one of the frame and access door; and
   (e) a flat spiral spring for each guide member, said flat spiral springs each having a coil of a plurality of convolutions engaged with a respective guide member and a portion extending therefrom with an end secured relative to the other of said frame and closure member said spiral springs being operable to bias the access door into sealing engagement and in response to negative pressure in said duct to permit said access door to temporarily displace from said sealing engagement for relief of said negative pressure and to return into sealing engagement.

7. A vacuum relief and access door assembly as set forth in claim 6 wherein:
   (a) said sealing means is mounted on said closure retaining portion;
   (b) said access door is on the duct side of said frame and has sealing engagement against said sealing means to normally close said access opening, said access door is displaceable inwardly toward the duct to provide access into and vacuum relief for said duct;
   (c) said flat spiral springs are strips wound into coiled portions of a plurality of convolutions unwinding as an end portion is pulled therefrom and biased to recoiling of same.

8. A vacuum relief and access door assembly as set forth in claim 7 and including:
   (a) said guide members are on the frame at opposite sides of the access opening and have wall portions extending therefrom away from the duct with a respective edge spaced outwardly from said frame, and a rear surface extending from said edge toward the frame;
   (b) said spiral springs extending from the access door over said edges with the coil thereof engaged with said rear surface between the respective edge and frame, said springs being coiled inwardly from the portion extending over said respective edge.

9. A vacuum relief and access door assembly as set forth in claim 8 and including:
   (a) means on the walls of the guide members limiting lateral movement of said spiral spring portion extending over the respective edge thereof;
   (b) said coils of said spiral springs being positioned relative to the respective edges of the guide member walls and in engagement with said rear surfaces to retain their positions and bias the access door into closed position with negative pressure in the duct applying force to said spiral springs to unwind the coils as the door moves inwardly of the duct to relieve the negative pressure.

10. A vacuum relief and access door as set forth in claim 9 wherein:
    (a) said coils of the spiral springs are restrained only by position and sliding engagement with the respective edges and rear surfaces of the walls of the guide members and the unwinding forces thereof are substantially linear.

11. A vacuum relief and access door as set forth in claim 10 wherein:
    (a) the coils of each spiral spring is hooked over a respective guide member and the engagement thereof is independent of the engagement of the other spiral springs and a spiral spring is operative to permit the access door to pivot relative to the door frame when all other spiral coils are released from respective guide members.

* * * * *